United States Patent [19]

Gould et al.

[11] 4,101,191

[45] Jul. 18, 1978

[54] MOUNTING BRACKET ASSEMBLY FOR PEDESTRIAN TRAFFIC SIGNAL

[75] Inventors: James S. Gould, Los Alamitos; Samuel Gould, San Pedro, both of Calif.

[73] Assignee: Indicator Controls Corporation, Gardena, Calif.

[21] Appl. No.: 778,077

[22] Filed: Mar. 16, 1977

[51] Int. Cl.$^2$ ............................ E01F 9/01; H02B 1/08

[52] U.S. Cl. .............................. 339/125 R; 248/219.3; 248/230; 340/44; 340/119

[58] Field of Search ........................ 339/119 R, 125 R; 248/218.4, 219.3, 219.4, 230, 231; 340/41 R, 44, 108, 119

[56] References Cited

U.S. PATENT DOCUMENTS

| | | | |
|---|---|---|---|
| 1,812,203 | 6/1931 | Gaskill | 248/219.4 |
| 2,041,995 | 5/1936 | Edwards | 339/125 R X |
| 2,846,570 | 8/1958 | Harling | 248/219.3 X |
| 3,012,750 | 12/1961 | Schermerhorn | 248/231 |
| 3,564,495 | 2/1971 | Gould et al. | 340/44 |

*Primary Examiner*—Roy Lake
*Assistant Examiner*—E. F. Desmond
*Attorney, Agent, or Firm*—Keith D. Beecher

[57] ABSTRACT

A two-piece bracket assembly is provided for a pedestrian traffic signal unit for mounting the unit on an upright pole. The bracket consists of a first piece which is bolted or strapped to the pole, and a second piece which is mounted on the side of the signal unit. The two pieces are removably hinged together by appropriate hinges, and are shaped to form an enclosure when turned about the axis of rotation of the hinges to a closed facing position. The energizing wires for the signal unit are brought up through the interior of the pole and through an opening in the first piece of the bracket to be connected to a terminal strip in the second piece of the bracket. The terminal strip is connected to wires extending into the signal unit itself, the wires being connected to the electrically energized illuminating elements within the unit. The two hinged pieces of the bracket are held in their closed position by locking bolts emanating from inside the pedestrian signal, or by other appropriate fastener means, such as straps.

9 Claims, 4 Drawing Figures

MOUNTING BRACKET ASSEMBLY FOR PEDESTRIAN TRAFFIC SIGNAL

BACKGROUND OF THE INVENTION

Pedestrian traffic signals are presently in widespread use. Most pedestrian traffic signals include a rectangular-shaped housing having a face plate with an upper portion bearing the legend "DONT" and a lower portion bearing the legend "WALK". The pedestrian traffic signal is usually located at the end of a crosswalk and when the lower portion of the face plate is illuminated, the "WALK" legend appears to indicate to pedestrians that they may enter the cross-walk. However, when both the upper and lower portions are illuminated, both legends "DONT" and "WALK" appear to indicate to pedestrians that they may not enter the cross-walk.

For years the pedestrian traffic signal units have been mounted in supporting poles by a complex assembly of pipes and junction boxes which are not only heavy and expensive, but which make the installation of the signal units on the poles a difficult and arduous operation which entails holding the units in the air while appropriate fittings are installed and connected together.

The two-piece mounting bracket of the present invention represents a simple and economical means for mounting a pedestrian signal unit on an upright pole. As explained briefly above, one piece of the mounting bracket is affixed to the pole, and a second piece is mounted on the side of the signal unit. The pedestrian traffic signal unit is mounted on the pole merely by hooking female hinge portions of one of the bracket pieces over male hinge portions of the other, so that the two bracket pieces are fitted together in a hinged relationship. The electric wires from the interior of of the pole are then connected to the terminals of the terminal strip in the second bracket piece, and the pedestrian traffic signal unit is turned in a direction to close the two pieces of the mounting bracket. The locking bolts emanating from inside the pedestrian signal are then inserted through the two pieces to hold the mounting bracket securely in its closed position.

The construction of the mounting bracket of the invention is such that the electrical connections within its interior are completely sheltered from the weather. The mounting bracket, moreover, is constructed to permit limited turning of the pedestrian traffic signal unit and the mounting bracket about the pole to square up the signal unit with the crosswalk before the bolts mounting the bracket on the pole are tightened.

The mounting bracket of the invention enables the pedestrian traffic signal unit easily and conveniently to be mounted on the pole, and it also enables the signal unit to be easily removed from the pole for repair or replacement purposes. The removal of the signal unit is achieved merely by opening the unit, removing the two locking bolts from the mounting bracket, swinging the unit about the hinge axis of the mounting bracket to open the two pieces of the mounting bracket, disconnecting the wires from the terminal strip inside the mounting bracket, and unhooking the unit and second piece of the mounting bracket from the first piece of the bracket.

DETAILED DESCRIPTION OF THE ILLUSTRATED EMBODIMENT

Figure 2:
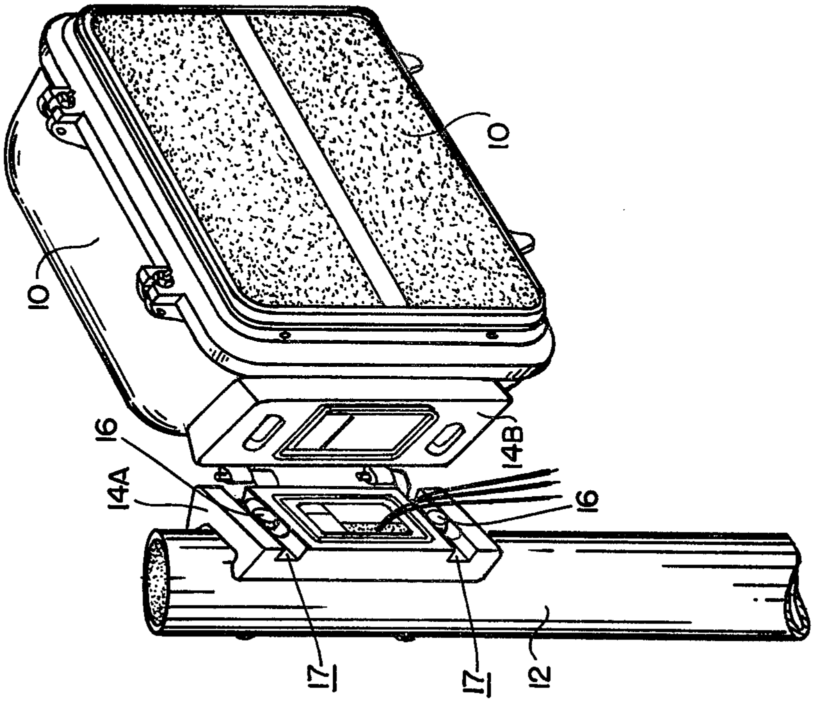
FIG. 2 is a view similar to the view of FIG. 1, but with the mounting bracket in an open position.
Figure 1:
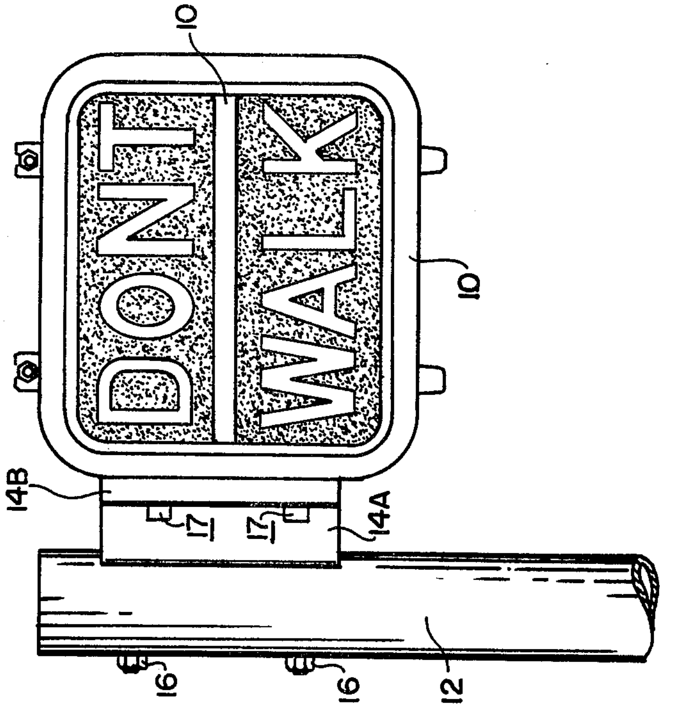
FIG. 1 is an elevational view of a pedestrian traffic signal unit mounted on an upright pole by a two-piece mounting bracket constructed in accordance with the invention, and using the locking bolt optional method of mounting the bracket to the pole, the view being taken essentially from the front of the unit and showing the mounting bracket in a closed position.

As shown in FIGS. 1 and 2, for example, a usual rectangular-shaped pedestrian signal traffic unit 10 is mounted on an upright pole 12 by a two-piece mounting bracket assembly **14*a*, 14*b* which is constructed in accordance with the concepts of the invention. The piece 14*a* of the mounting bracket is affixed to the pole 12 by a pair of locking bolts 16 extending from inside the mounting bracket through slots in the piece 14*a* (FIG. 3) and through the pole 12. Channels 17 are also provided to permit strap mounting, if so desired. The construction is such that before the bolts 16, or mounting straps, are tightened, bracket piece 14*a* may be turned a limited amount around the pole to the extent of the slots. This permits the traffic signal unit 10** to be squared-up with the crosswalk.

Figure 3:
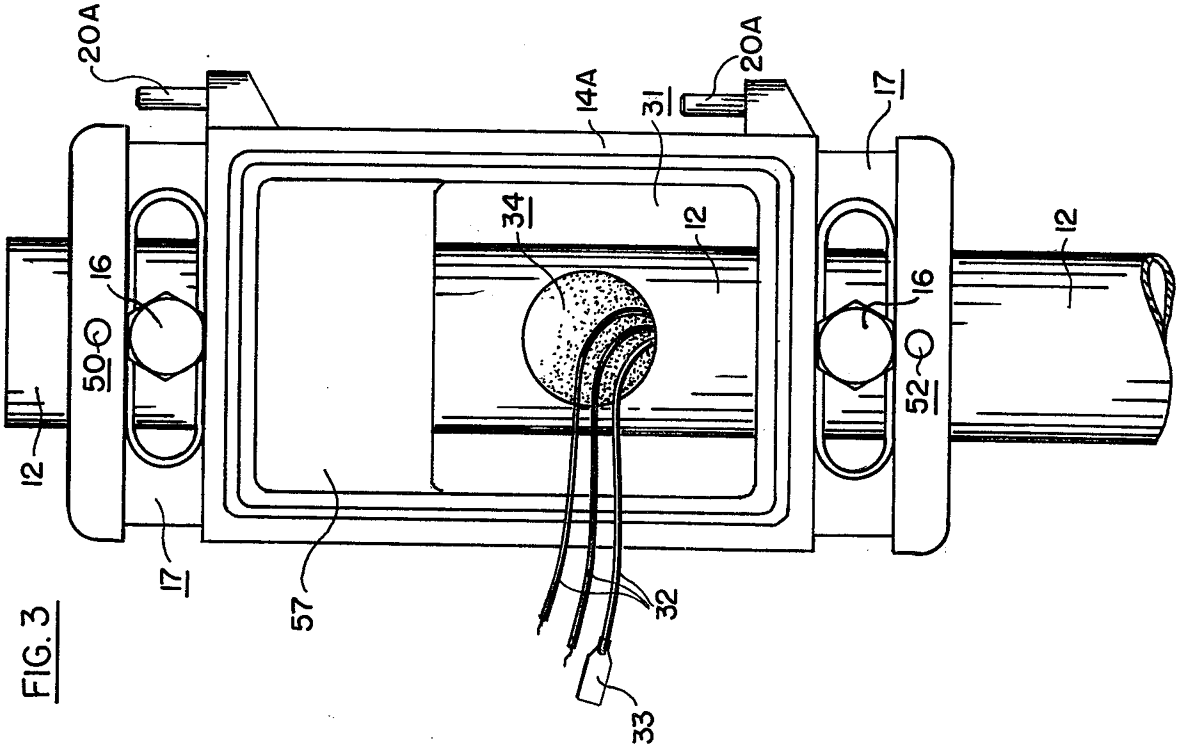
FIG. 3 is a front elevation of one piece of the mounting bracket of the invention mounted in place on an upright pole.

It will be noted in FIG. 3, that the width of slot 17 is such to receive the head of bolt 16 and prevent the bolt from turning. Thus, a wrench can be used on the opposite side of the pole to loosen the bolt to enable minor lateral adjustments to be made without needing to open the bracket assembly.

Figure 4:
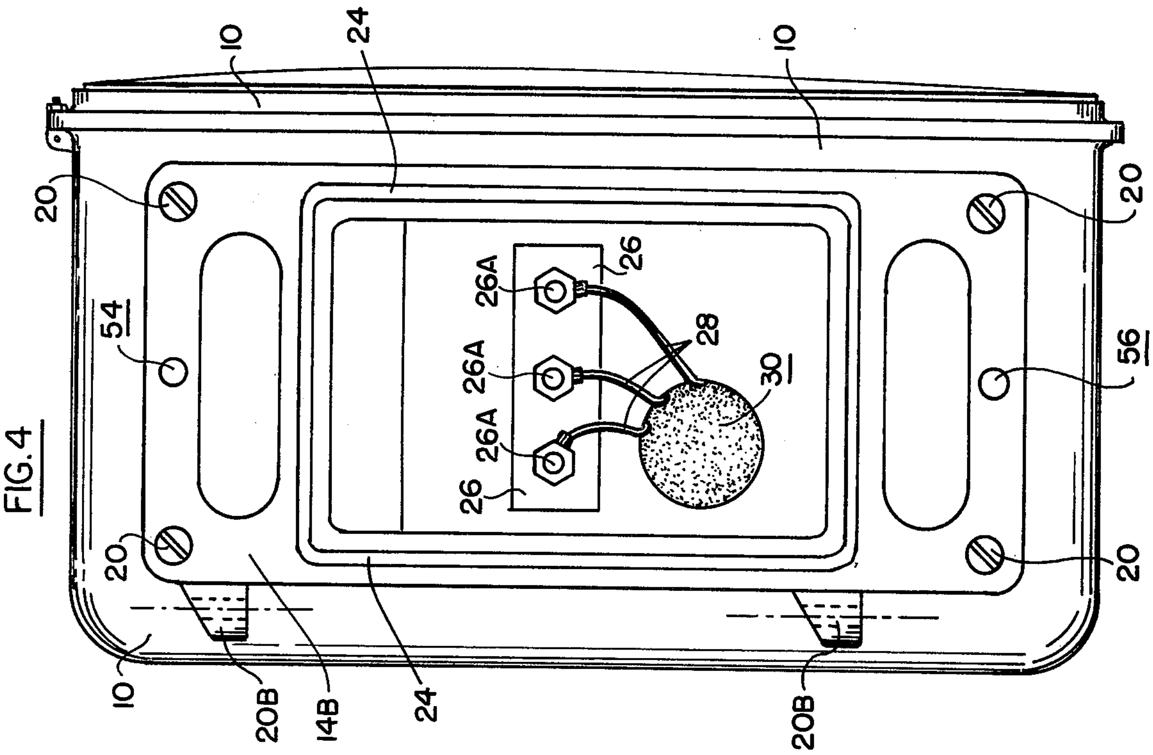
FIG. 4 is an elevational view of the second piece of the mounting bracket mounted in place on the side of a pedestrian traffic signal unit.

The piece **14*b* of the mounting bracket is mounted on one side, or on the back, of the pedestrian traffic signal unit 10 by appropriate mounting bolts 20 (FIG. 4). The piece 14*a* is provided with male hinge portions 20*a*, each equipped with an upwardly extending tapered pin. The piece 14*b* is equipped with female hinge portions 20*b* which may be hooked over the tapered pins of the male hinge portions 20*a* to bring the two pieces into a hinged relationship. One of the tapered pins of the male hinge portions 20*a*** may be made longer than the other to facilitate the mounting of the female portions over the male portions.

The pieces **14*a* and 14*b* of the mounting bracket are shaped to define an enclosure when the unit 10 is turned about the axis of the hinges to bring the two pieces into a facing juxtaposed relationship. The enclosure shelters the electrical connections from the weather by the addition of an appropriate gasket, the gasket being received in a channel 24 in the mounting bracket piece 14*b*. A terminal strip 26 is mounted on piece 14*b* within the enclosure formed by the two pieces. The terminal strip includes terminals 26*a* connected to electric wires 28 which extend through an opening 30 in piece 14*b*, and the wires also extend through an opening in the side of the pedestrian signal 10 to be connected to appropriate electrically-energized illuminating elements within the signal unit. A plug may be inserted in opening 30 which closely fits the three wires 28. In this way, bracket 14*b*** may be installed on the pedestrian signal in such a manner that the signal remains watertight.

The mounting bracket piece **14*a*, on the other hand, has an opening 31 through which wires 32 from the interior of pole 12 extend through a hole 34 in the pole into the enclosure formed by the bracket. The wires 32 are connected to the respective terminals 26a on terminal strip 26 to complete electrical connections to the illuminating elements within the pedestrian signal unit 10. Quickdisconnect plugs, such as plug 33, may be provided for wires 32, to connect the wires 32 to terminals on terminal strip 26**, if so desired.

As described briefly above, the pedestrian signal unit 10 may be easily mounted on pole 12 by first mounting the piece 14a of the mounting bracket on the pole, and the piece 14b of the mounting bracket on the side of the unit, and by connecting the wires from the unit to the terminals 26a. The pedestrian signal unit is then mounted on the pole merely by hooking the hinge portions 20b of piece 14b to the hinge portions 20a of piece 14a. The signal unit 10 is then turned about the axis of rotation of the hinges to close the two pieces of the mounting bracket.

The signal unit may be squared across the crosswalk, and then the mounting bolts 16 tightened from the opposite side of the pole 12. Holes 50 and 52 are provided in piece 14a and holes 54 and 56 are provided in unit 14b which receive lock bolts for securely holding the two pieces of the mounting bracket in a closed position. When the mounting bracket is closed, the terminal strip 26 extends into an enclosure including an integral drip plate 57 in piece 14a, fully to protect the terminals on the terminal strip from moisture. The opening 31 permits the enclosure to be self-draining. This is important since it precludes any tendency for the bracket to fill with water and short out the electric terminals.

The invention provides, therefore, a simple and inexpensive mounting bracket containing the electrical junction box for a pedestrian traffic signal, which permits the signal to be mounted easily and conveniently on an upright pole.

While a particular embodiment of the invention has been shown and described, modifications may be made. It is intended in the claims to cover the modifications which come within the spirit and scope of the invention.

What is claimed is:

1. In combination: an upright pole; a rectangular-shaped pedestrian traffic signal unit; a two-piece bracket for removably mounting the signal unit on the pole, said bracket including a first cavity-defining piece mounted on the pole having an open front and including an opening in the back thereof for receiving electric wires from the interior of the pole, a second cavity defining piece mounted on one side of the pedestrian traffic signal unit having an open front and including an opening in the back thereof for receiving electric wires from the interior of the unit, hinge means mounted on the first and second pieces to permit the second piece to be removably hinged to the first piece, the first and second pieces being shaped to define an enclosure for the electric wires therebetween within the cavities defined thereby when the two pieces are turned about the axis of said hinge means into facing juxtaposed relationship.

2. The combination defined in claim 1, and which includes a terminal strip mounted in the cavity defined by said second pieces, said terminal strip including terminals connected to the electric wires from the interior of the unit and for removably receiving and making electrical contact with the wires from the interior of the pole.

3. The combination defined in claim 1, and which includes a drip plate integral with the first piece to protect the electric wires in the enclosure from moisture.

4. The combination defined in claim 3, and which includes an opening in the first piece under the drip plate to prevent the enclosure from filling with water.

5. The combination defined in claim 1, and which includes fastener means for attaching the first piece to the pole and permitting limited rotational movement of the first piece around the pole to a desired angular position thereon before the fastener means is tightened.

6. The combination defined in claim 1, which includes fastener means for attaching the first piece to the pole, and in which said fastener means comprises bolts extending from the enclosure through holes in said first piece into said pole.

7. The combination defined in claim 1, in which said first piece has channels formed therein for receiving mounting straps for attaching said first piece to the pole.

8. The combination defined in claim 7, and which includes bolts extending from the enclosure through holes in the first piece into said pole, the heads of the bolts being received in said channels to prevent rotation of said bolts.

9. The combination defined in claim 1, in which said electric wires from the interior of said pole have quick-disconnect plugs attached to the ends thereof.

* * * * *